H. MOCK.
REFRIGERATOR LINING.
APPLICATION FILED JAN. 27, 1919.
1,309,866.
Patented July 15, 1919.
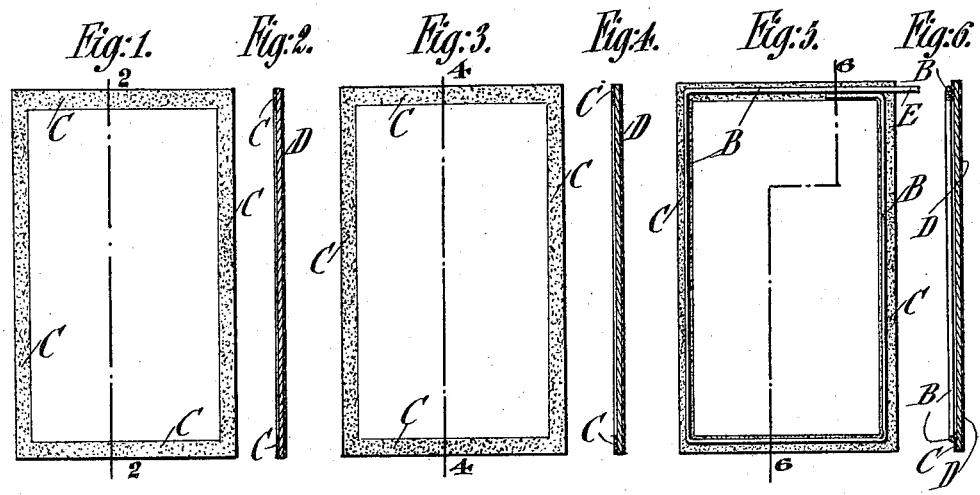
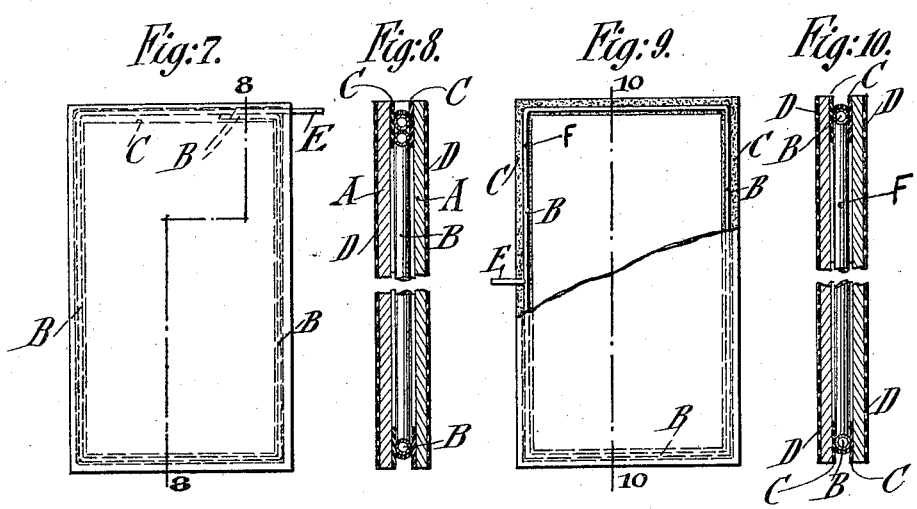
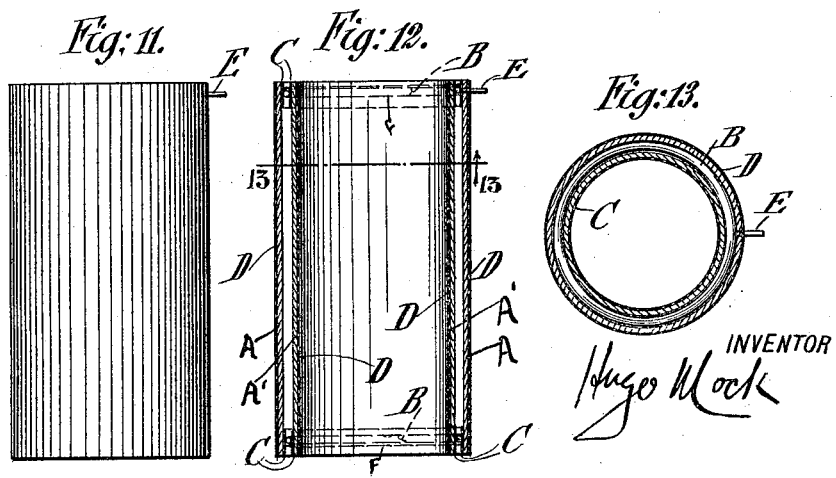
INVENTOR
Hugo Mock

UNITED STATES PATENT OFFICE.

HUGO MOCK, OF NEW YORK, N. Y.

REFRIGERATOR-LINING.

1,309,866.  Specification of Letters Patent.  Patented July 15, 1919.

Application filed January 27, 1919. Serial No. 273,210.

*To all whom it may concern:*

Be it known that I, HUGO MOCK, a citizen of the United States, residing at New York, in the county of New York and State of New York, have invented certain new and useful Improvements in Refrigerator-Linings, of which the following is a specification.

This invention has for its object the provision of an improved refrigerator lining, and more especially of a lining for the interior of a refrigerator which will at the same time serve as an efficient non-conductor of heat.

More especially, it has for its object an improvement in refrigerator linings of the class now largely used in refrigerators and known as enamel linings, wherein the inside of the refrigerator has an enamel or glass-like finish which can be easily cleaned and which is attractive in appearance.

In the drawings,

Figure 1 represents an upright perspective view of one of the metal plates which form the refrigerator lining, Fig. 2 is a sectional view along line 2—2 of Fig. 1, Fig. 3 represents the opposite plate used to form the refrigerator lining unit, Fig. 4 is a sectional view along the line 4—4 of Fig. 3, Fig. 5 is an upright perspective view of one half of the refrigerator unit, lining or member, showing the hollow glass connecting tube which unites same with the other metal plate, Fig. 6 is a sectional view along the lines 6—6 of Fig. 5, Fig. 7 is a perspective view of the complete refrigerator lining or unit showing in outline the connecting tube which unites the two halves, Fig. 8 is a sectional view along the line 8—8 of Fig. 7 and shows the complete refrigerating unit assembled and ready to be exhausted, Fig. 9 shows a metal plate with a different form of connecting glass tube, Fig. 10 is a sectional view of Fig. 9 along the lines 10—10, Fig. 11 is an upright perspective view of a cylindrical unit made according to the principles illustrated from Figs. 1 to 10, Fig. 12 is a vertical sectional view of the same unit, and Fig. 13 is a horizontal sectional view along the line 13—13 of Fig. 12.

Particular attention is called to Fig. 8 which fully illustrates the various parts of the refrigerator lining or unit.

A are two metal plates having the outside and the edges thereof covered with a glass-like or vitreous enamel named as D in the drawings, and having their inner surfaces bearing an enamel around their edges only, this enamel on the inner surface being marked C. B is a glass tube which will unite the members A to each other and will inclose an air space as will be hereinafter explained. The glass tube B has one of its ends on the inside of said plates and the other end protruding slightly from the exterior of said plates so that the air space between said plates can be exhausted.

In Fig. 9 is shown a slightly different form of tubing, there being a perforation on the inside of said tubing F so as to connect with the air space so as to permit exhaustion thereof, said exhaustion being accomplished by the nipple E so as to render the vacuum permanent.

It is evident that in the modification shown in Fig. 12, two glass tubes B are necessary, one of which bears the nipple E for exhausting the air space between the walls A and A', said tubes B being placed at each end of the cylindrical members A and A'.

In order to permanently connect the two plates together by means of the tube B, the tube B is fused to the layer of enamel C on each plate and for this purpose it is desirable to add additional enamel on top of the tube B so that the tube B may be fused in a perfect and air-tight manner to both plates A.

It is desirable that the tube B have a coefficient of expansion approximating the coefficient of expansion of the enamel C or D so that an intimate and perfect union may be formed between the tube B and the enamel C.

It is also desirable that the additional enamel employed to fuse tube B to enamel C have a similar coefficient of expansion and may be durably united to both bodies and may be fused therewith. This fusion may be accomplished either by means of a blow pipe or in a furnace.

It will be evident that after the two plates A are hermetically joined to the tube B, a space is inclosed between the two said plates and this space is exhausted by means of the nipple E so as to form a vacuum in said space. I have made it a particular object herein not to coat the inside of each plate A on its entire surface as, if a certain portion of the inner surface of the plate A is left unenameled, the metallic surface left exposed is useful in preventing radiation of heat as enamel is a much better radiator of heat than a metal surface.

It is also desirable to give the inner metallic surface of A as high a polish as possible in order to increase the efficacy of this surface as a non-radiator. After the operation of exhaustion is completed and the nipple E sealed at a point as near the edge of A as possible, the complete refrigerator lining or unit is ready.

It will be apparent that either side of this unit presents a smooth, glass-like surface which is wanted in refrigerator linings and that the unit as a whole will be an extremely efficient non-conductor of heat and will occupy very little space.

Any number of units of this character may be employed in a refrigerator depending on the size thereof and it is apparent that even for a small box refrigerator not less than six should be employed, that is, one for each side thereof.

Figs. 11 and 12 present the use of the same principle employed in these flat refrigerators and a cylindrical refrigerating unit in which A represents two concentric cylinders, B tubes at each end of said cylinders connecting same in a like manner as the flat plates A are connected. C represents the enamel on the inside of the larger cylinder and the outside of the smaller cylinder and D represents the enamel on the inside of the small cylinder and the outside of the larger cylinder. One of the tubes B in this form has an opening as shown in order to connect with the space between said cylinders and the usual nipple for exhausting said space.

It is evident that it is impracticable to make an all-metal vessel which will also function as a refrigerator lining for the reason that with an all-metal vessel inclosing a lining so much heat is lost by direct conduction from one side of the metal to the other that the whole efficacy of the vacuum as a heat non-conductor is lost. It is for this reason that a vitreous or other non-conducting substance such as the tube B is needed so as to insulate the metal plates from each other.

What I claim is:—

1. In a heat insulator, the combination of metallic plates spaced apart and hermetically joined together by a vitreous material so as to inclose an air space, said plates having a vitreous lining on the outside and a partially vitreous lining for a part of their surfaces on the inside.

2. A heat insulator comprising two enamel metallic plates connected by a vitreous substance so as to inclose an air space, said air space being exhausted to form a vacuum and said plates having their outer surfaces completely lined with a glass-like enamel.

3. In a heat insulator, metallic plates hermetically joined to each other so as to inclose an air space, said air space being exhausted to form a vacuum, the sides of said plates adjacent said air space having a metallic surface and the sides of said plates not adjacent to said surface having an enameled surface.

4. In a heat insulator, metallic plates joined together by a vitreous substance so as to inclose an air space, said air space being exhausted to form a vacuum and said plates being enameled on their surfaces with the exception of the surfaces joining said exhausted air space.

In testimony whereof I hereunto affix my signature.

HUGO MOCK.

Copies of this patent may be obtained for five cents each, by addressing the "Commissioner of Patents, Washington, D. C."